UNITED STATES PATENT OFFICE 2,655,941

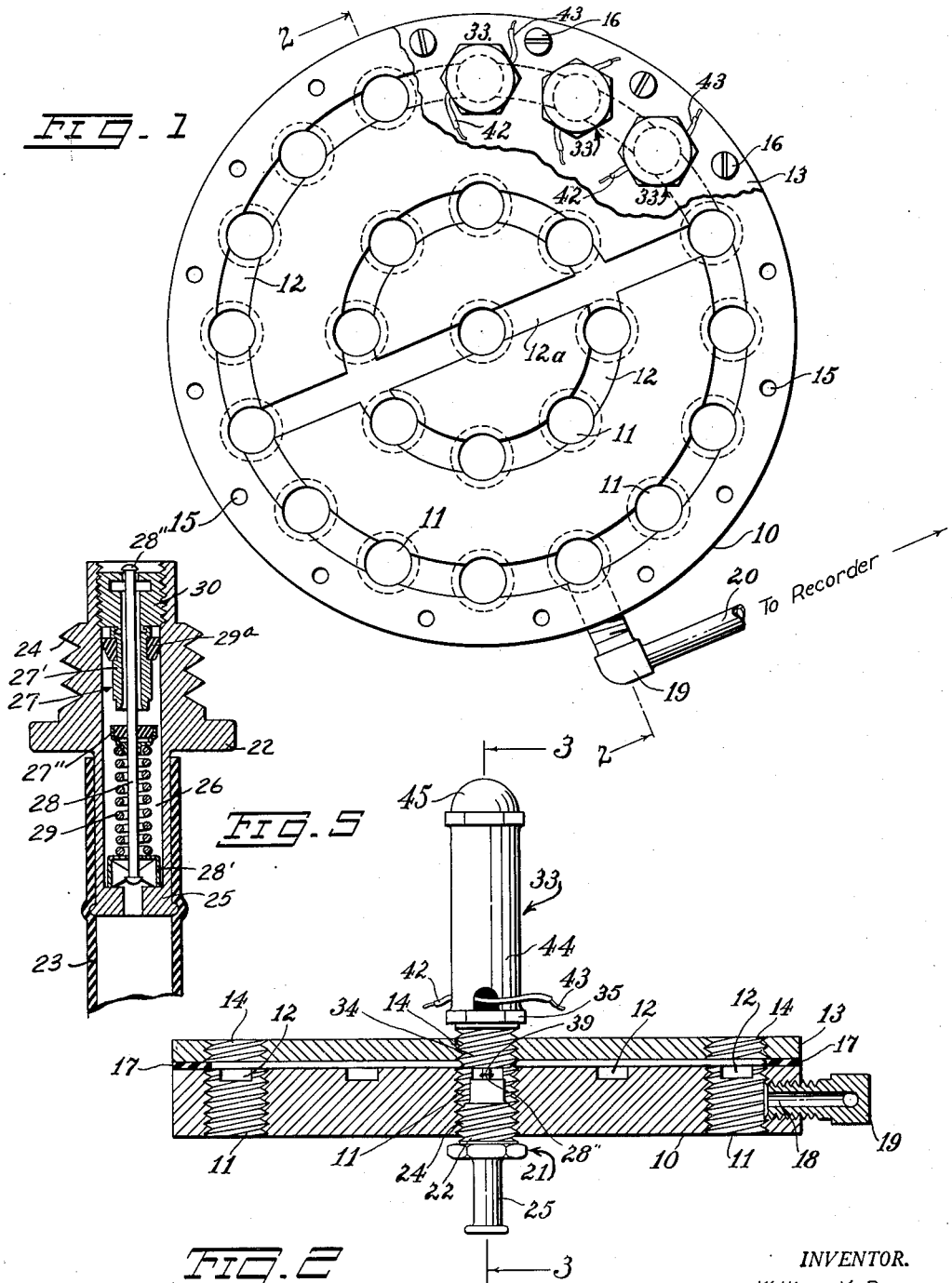

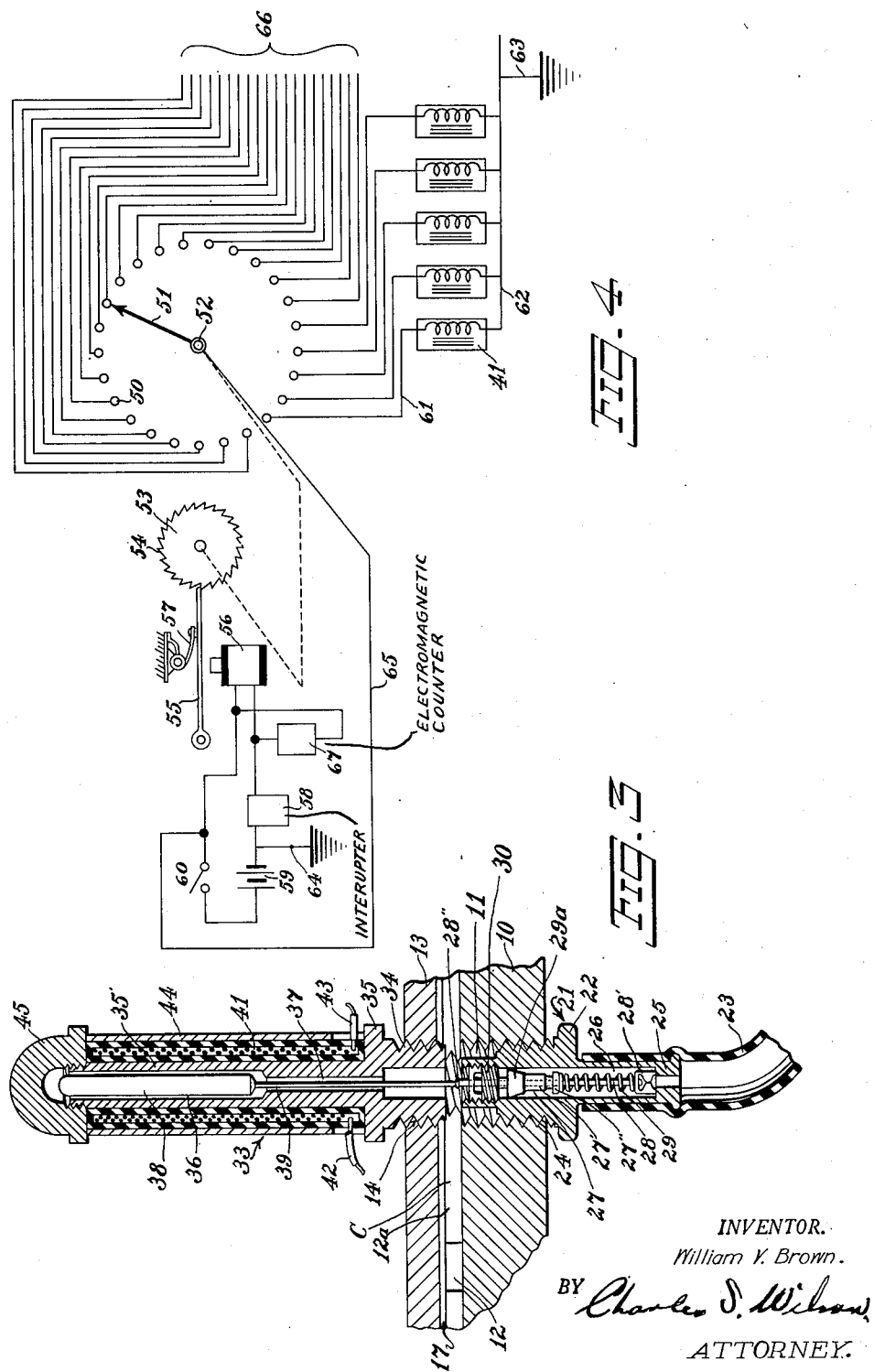

PRESSURE SELECTING SYSTEM AND MECHANISM

William V. Brown, Flushing, N. Y., assignor to Republic Aviation Corporation, near Farmingdale, N. Y., a corporation of Delaware Application August 15, 1946, Serial No. 690,665

6 Claims. (Cl. 137—627)

1

This invention relates generally to systems and the components thereof for the collection and distribution of fluid pressures and specifically contemplates the selective regulation and control of the flow of fluid between a plurality of conduits to the end that a multiplicity of independent and distributed pressures may be selectively and/or successively recorded at and upon a single instrumentality.

More particularly this invention is designed for use in the testing of aircraft where air pressures or air streams at, on or over various points on, or parts of, the aircraft structure may be independently conducted to a common point and be there individually selected for delivery to a recording or indicating mechanism or mechanisms.

With the above and other objects in view, as will be apparent, this invention consists in the construction, combination, and arrangement of parts, all as hereinafter more fully described, claimed and illustrated in the accompanying drawings, wherein:

Fig. 1 is a plan view of the manifold employed in the present system showing a major portion of its cover plate broken away and several valve actuating electromagnets mounted in the cover plate;

Fig. 2 is a section taken along line 2—2 of Fig. 1 through the manifold to illustrate an inlet valve and the coacting electromagnetic actuating means, as well as the common outlet from the manifold whereby selected pressures may be delivered to a recorder;

Fig. 3 is a section taken along line 3—3 of Fig. 2 through a valve and its actuating means;

Fig. 4 is a circuit diagram illustrating one arrangement for automatically controlling the selection and measurement of a multiplicity of independent pressures for individual delivery to a single indicator or recorder; and Fig. 5 is an enlarged cross-section of the valve assembly shown in Fig. 3.

In testing the flight characteristics of aircraft, surface pressures at salient points throughout the structure, as well as the air flow over the surfaces, should be measured and recorded. Heretofore this has been accomplished by providing a gauge individual to each test point but in view of the many points at which test readings are required space and weight limitations imposed by the aircraft structure has greatly limited and restricted the number of measurements and recordings possible during a single test flight. Thus a number of test flights were required to complete a record of all pressures and

2 airflow conditions throughout the aircraft structure and the recorded data gathered during these multiple test flights must be correlated in order to obtain flight test information as to the entire aircraft as a unit or any part thereof. The final correlation of the series of recordings thus could only be approximations because conditions under which each of the several test flights was made frequently varied from the conditions of the other and complemental test flights. Manifestly therefore the prior methods and apparatus for making pressure and air flow tests produced generally unsatisfactory and inaccurate results and yet were expensive and time consuming.

The present invention proposes a system and apparatus by which a single gauge, indicator or recorder is provided in combination with a manifold connected to all points or surfaces to be tested and a controlling and operating mechanism whereby the pressure from each test point or surface may be selectively and/or successively directed and delivered to the gauge or indicator. Hence the instant invention enables the measurement or indication and also the recording of the pressures or air flows at all salient test points of the aircraft during a single test flight each recording being made under the same or approximately the same conditions.

Referring to the drawings, the manifold or distributing unit used in the instant system consists of a base 10 having a plurality of threaded sockets 11, each socket extending through the base to be opened at its ends and in each face of the base. Any number of the sockets 11 may be provided in the base 10 and they are arranged in any suitable pattern within the limits of the base. Here they are shown as being arranged in concentric rows or series each row or series being interconnected by the grooves or passages 12 formed in the inner face of the base 10 between adjacent sockets. The grooves 12 of each series or row combine with the sockets of that row or series to form a continuous, uninterrupted passage and where the sockets 11 are arranged in concentric rows or series at least one lateral or transverse groove 12a connects each row or series of sockets 11 to each other row or series in the base 10. In this manner each socket 11 is connected by the grooves to every other socket in the base. It is manifest that the pattern or arrangement of the sockets 11 in the base 10 may be infinitely varied so long as all of said sockets can, on occasion, communicate with a common chamber or passage C defined by or contained within the manifold or distributing unit as will be hereinafter more fully described.

Disposed upon and coextensive with the inner or grooved face of the base 10 is a cover plate 13. This plate 13 is pierced by a plurality of threaded apertures 14, one corresponding to and registering with each of the sockets 11 of the base 10 when the cover plate is assembled on and secured to the base. The plate 13 may be attached to the base 10 over its inner or grooved face by any suitable means, such for example as by the screws 16 passing through openings in the edge portion of the plate to be received in corresponding threaded holes 15 formed in the base 10 adjacent its edge. To seal the joint between the plate 13 and the base 10 at the edges thereof a relatively narrow and thin, elastic gasket 17, is interposed between the edge portions thereof to be clampingly held in position without obstructing the grooves 12—12a, the sockets 11 or the apertures 14.

The manifold above described is primarily for the purpose of assembling or gathering independent pressures from and in a series of fluid conduits and successively and individually delivering them to a single indicator or recorder. Therefore, in addition to the threaded holes 11, each adapted to receive and mount an inlet valve 21, a single outlet passage 18 is provided in the edge of the manifold base 10 to communicate with the space or chamber C defined by said base and the cover plate 13 as exemplified by the grooves 12—12a, through one of the sockets 11 adjoining the edge of the manifold. However, since it will be evident that it is only required that this passage 18 communicates at its inner end with the chamber C or any portion thereof, the passage may be located in any convenient part of the manifold so long as it meets this requirement. Into this outlet passage 18 is secured a fitting 19 connecting through a pipe or tube 20 with any suitable recorder, such as a pressure gauge or bellows (not shown).

Each socket 11 is to receive and mount an inlet valve 21 for controlling the transfer to the chamber C of the manifold pressure from a tube 23 connected to the valve and extending to any test point or source of pressure. The valve 21 can be of any standard construction designed normally to arrest the passage of fluid from the tube 23 to the chamber C of the manifold but capable of being opened on occasion to permit fluid flow from the tube to the chamber. An example of such a valve consists of the substantially cylindrical, hollow body 22 provided at one end with the external threads 24 for securing it in a socket 11 of the manifold base 10, and at the opposite end with a reduced cylindrical nipple 25 for reception within the inlet or pressure tube 23. Within the passage or bore 26 of the valve body 22 is positioned a spring operated, normally closed valve assembly 27 consisting of a stem 28 mounted at one end in a bracket 28' and projecting at its opposite end beyond the inner end of the body to constitute an operating extension 28''. A sleeve 27' is loosely mounted on the stem 28, the diameter of the passage through this sleeve being appreciably greater than that of the stem so that fluid may freely pass through the sleeve around the stem. The lower end of the sleeve 27' comprises a seat for the valve 27'' fixed to the stem 28 and an expansion spring 29 surrounding the stem and abutting the valve 27'' and the bracket 28' at its ends normally seats the valve to close the passage through the sleeve 27'. The passage or bore 26 of the valve body or casing 22 is closed against fluid flow, except through the passage in the sleeve 27', by a seal 29a secured medially to the sleeve and operating against the wall of the bore 26. The valve assembly 27 is held in place in the body or casing 22 by a plug 30 threaded into the upper end of the passage or bore 26 of the casing or body 22 through which the operating extension 28'' passes and beyond which it projects as shown in Figs. 2 and 3. The construction of the valve assembly 27 per se forms no part of the present invention and any other type of valve capable of performing to meet the requirements hereof will serve equally well.

Any pressure exerted on the operating extension 28'' sufficient to overcome the spring 29 will move the stem 28 downwardly through the sleeve 27' and with it the valve 27'' away from its seat at the inner end of the sleeve. A connection between the sleeve 27' and the plug 30 holds the former against any movement with the stem 28. The movement of the valve 27'' away from its seat permits the flow of fluid under pressure through the nipple 25, the sleeve 27' and the plug 30 into the chamber C or a part 12—12a thereof for eventual delivery to and through the fitting 19 and pipe 20 to an indicator or recorder. The removal of the operating pressure from the extension 28'' of the stem 28 leaves the spring 29 free to operate to seat the valve 27'' and thus close the tube 23 and valve casing 22.

Cooperating with each of the inlet valves 21, for electrically controlling the operation thereof, is a plunger type electromagnet 33 secured in one of the threaded holes 14 of the plate 13 by corresponding threads 34 on the magnet body 35. Within the magnet body 35 are the longitudinally coextensive passages 36 and 37, the upper or former being the larger for slidably receiving a magnetic plunger 38 carrying the valve actuating pin 39 at its inner end for reciprocation in the smaller passage 37. The pin 39 extends from the plunger 38 to a point within the chamber C where it physically contacts the operating extension 28'' of the valve stem 28. Surrounding the main section 35' of the magnet body 35 is an insulated magnetizing winding 41 having leads 42 and 43 for connection to a suitable power source and an outer shield 44 for protecting the winding. A cap 45 is threaded to the outer end of the body 35 to retain the plunger 38 within the passage 36 and hold the winding 41 and shield 44 in position.

To operate the magnet 33 and thereby open the valve 21, a suitable power source can be connected to the leads 42 and 43 of the magnet to energize the coil 41 and cause the plunger 38 to move downwardly within the passage 36. This downward movement of the plunger 38 is transmitted to the valve stem 28 of the valve 27'' through the valve operating pin 39 and the operating extension 28''. Since the normal position of the valve 21 is closed, actuation of the magnet 33 will depress the valve stem 28 and permit fluid from the inlet tube 23 to enter the chamber C of the manifold as heretofore described. As the outlet fitting 19 also communicates with the chamber C of the manifold, the fluid thus released from any tube 23 will pass freely from the inlet tube to the outlet fitting and through the conduit 20 to be registered by the recorder (not shown). Although in the illustrated embodiment of this invention provision is made for a total of twenty-five valves 21 each associated with an individual operating magnet 33, it is apparent that any number of such valves or banks thereof and associated operating mechanisms may be employed.

Any suitable electrical circuits and control device which will afford the desired type of selective control for the valves 21 and magnets 33 may be used, one form of selective valve control and electrical circuit suitable for this purpose being shown in Fig. 4. This control comprises an electromagnetically operated rotary switch assembly having a series of contacts 50 situated to coact with a rotary contact arm 51 mounted on a pivot 52 for successively cooperating with each of the contacts 50 during its rotation. Mechanically coupled to the contact arm 51, but electrically insulated therefrom, is a ratchet 53 having spaced peripheral teeth 54. A pawl 55 engages the teeth 54 of the ratchet 53 and when actuated or moved downwardly by the magnet 56 advances the ratchet 53 one tooth and moves the control arm 51 to the next succeeding contact 50. A spring 57, mechanically attached to the pawl 55, is arranged to retract it each time it is released by the magnet 56 and position it for engagement with the next successive ratchet tooth 54 so that the operation may be repeated. From the foregoing description it is obvious that periodic actuation of the magnet 56 will rotate the ratchet 53 and cause the contact arm 51 to successively engage each one of the contacts 50.

Actuation of the magnet 56 may be by a manually operated switch or means of an interrupter 58 in series with a suitable power source, such as the battery 59, a starting switch 60, and the coil of the relay 56. Closing the starting switch 60 will complete the circuit and the interruptor 58 will provide periodic pulses of electrical energy to the magnet or relay 56 to produce periodic rotation of the ratchet 53 and the contact arm 51 as previously described.

Connected to each contact 50 of the rotary switch is the coil 41 of one of the plunger magnets 33, of which only five are illustrated in Fig. 4. One side of each of these coils 41 is connected to one of the contacts 50 through suitable leads 61 while the remaining side of each coil 41 is connected to a common bus 62 which in turn is connected to one side of the battery 59 through the ground connections 63 and 64. The circuit is completed by a lead 65 connecting the contact arm 51 to the switch 60 which is interposed between the battery 59 and the lead 65. With the foregoing arrangement as the contact arm 51 is advanced by the ratchet 53 to engage each successive contact 50, the coils 41 of the magnets 33 will be successively energized and each when energized will open the associated valve 21 to permit the registration of the pressure, existing in the inlet tube 23 secured to that valve, by the recorder. The leads 66 are provided for connecting the remaining coils 41 of the several magnets 33 which have not been illustrated in order to avoid unnecessary complication of the figure.

For the purpose of correlating the pressures indicated by the recorder with the particular inlet valve producing the reading, an electromagnetic counter 67 having a range of numbers at least equivalent to the number of valves 21 carried by the manifold may be used and so connected that each pulse delivered to the magnet 56 will actuate the counter and advance it one digit.

Although this invention has been described with reference to a single manifold assembly having a plurality of valves and a single recorder, it is obvious that a plurality of such manifolds and associated recorders may be employed simultaneously, additional rotary switches being provided for the control thereof.

What is claimed is:

1. An apparatus for the selection of fluid pressure to be measured, comprising a manifold including a hollow base and a cover plate to close and seal said base, said base and plate having a multiplicity of aligned and corresponding apertures and the base having a plurality of open grooves facing the plate and interconnecting said apertures, a valve and pressure conduit coacting with each aperture of the base, an electromagnet in each of the apertures of the plate and operably associated with the valve in the corresponding aperture of the body, automatic electrical means for sequentially operating said electromagnets to open the associated valves and thereby permit the transfer of fluid under pressure from the conduits to the grooves aforesaid, and an outlet means in constant, unobstructed, communication from the said grooves and adapted to be connected to a recorder.

2. An apparatus for selecting fluid pressures to be measured, comprising a manifold including a hollow base and a cover plate to close and seal said base, said base and plate having a multiplicity of aligned apertures and the base having a plurality of open grooves facing the plate and interconnecting said apertures, a valve coacting with each aperture of the base, an independent electromagnet in each of the apertures of the plate and operably associated with the valve in the corresponding aperture of the body, electric means for sequentially operating said electro-magnets to open the associated valves and thereby permit the transfer of fluid under pressure to the grooves aforesaid, and a single outlet passage in constant and uninterrupted communication with said grooves adapted to deliver fluid under pressure from the latter to a recorder.

3. In a fluid distributing and pressure measuring system the combination with a manifold including a relatively thick base section having a multiplicity of transverse apertures and a plurality of open grooves formed in its inner face connecting the said apertures, of a series of fluid conduits each connected to the outer end of one of said apertures a relatively thin cover plate closing covering the inner face of the base and pierced by a multiplicity of transverse holes in alignment with the apertures aforesaid, a valve in each of the base apertures to control the flow of fluid therethrough, a valve operating means secured in each of the holes in the plate and mechanically arranged to operate said valves, and means for sequentially controlling the valve operating means to permit the transfer of fluid from the conduits to the said grooves.

4. In a fluid pressure measuring and recording system the combination with a manifold including a base section, having a plurality of inlet sockets, a single outlet passage and a series of grooves formed in one face of the base in connection with each socket and the outlet passage of a cover plate flush with the grooved face of the body and pierced by an opening for and in alignment with each socket, a valve seated in and normally closing each socket, an electromagnetic valve operating means in each opening of the coverplate for coaction with and operation of the associated valve, a gas-tight seal between the cover plate and the body, and electrical means for automatically and successively operating the said magnets to thereby permit the transfer of fluid to the outlet passage through said valves and grooves.

5. In an apparatus for successively and individually measuring the pressures in a series of fluid conduits the combination with a manifold comprising a relatively thick base portion pierced by a multiplicity of sockets and having a series of channels formed in one face thereof interconnecting the said sockets, of an outlet communicating with all of said channels, a cover plate pierced by a transverse aperture in alignment with each socket in the base, a valve in each of the sockets adapted to be connected to one of the aforesaid fluid conduits, an individual electromagnet secured in each of the said apertures of the cover plate in operable association with the aligned valve, and electrical means, including a power source, for successively operating the magnets and their associated valves.

6. An apparatus for selecting fluid pressures to be measured comprising a manifold including a hollow base and a cover plate disposed to close and seal the base, the base and plate respectively having a plurality of aligned and corresponding apertures interconnected interiorly of the manifold, a valve means individual to each aperture of the base and adapted to be connected to a source of fluid pressure, an electromagnet in each aperture of the plate and operably associated with the valve in the aligned and corresponding aperture of the base, means for automatically operating said electromagnets to sequentially open the associated valves and thereby permit the transfer of fluid under pressure through the valves to the interior of the manifold, and a common outlet for the manifold adapted to be connected to a recorder.

WILLIAM V. BROWN.

References Cited in the file of this patent

UNITED STATES PATENTS

| Number | Name | Date |
|---|---|---|
| Re. 20,303 | Groff | Mar. 23, 1937 |
| 2,085,916 | Marra | July 6, 1937 |
| 2,139,919 | Watkins | Dec. 13, 1938 |
| 2,142,543 | Wheaton | Jan. 3, 1939 |
| 2,159,845 | Downey | May 23, 1939 |
| 2,376,022 | Wolcott | May 15, 1945 |
| 2,390,301 | Hart | Dec. 4, 1945 |
| 2,414,221 | Bristol | Jan. 14, 1947 |
| 2,420,588 | Dunnihoo | May 13, 1947 |